United States Patent
Xia et al.

(10) Patent No.: US 9,743,255 B2
(45) Date of Patent: Aug. 22, 2017

(54) TELEPHONY COLLABORATION SYSTEM AND METHOD FOR A TRUSTED ENVIRONMENT

(71) Applicant: Samsung Electronics Co., Ltd., Suwon-si, Gyeonggi-do (KR)

(72) Inventors: Zhiping Xia, San Jose, CA (US); Abraham Kang, Los Gatos, CA (US); Peter King, San Mateo, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 14/748,827

(22) Filed: Jun. 24, 2015

(65) Prior Publication Data

US 2016/0381522 A1    Dec. 29, 2016

(51) Int. Cl.
*H04W 4/08* (2009.01)
*H04W 76/02* (2009.01)

(52) U.S. Cl.
CPC .......... *H04W 4/08* (2013.01); *H04W 76/023* (2013.01)

(58) Field of Classification Search
None
See application file for complete search history.

(56) References Cited

U.S. PATENT DOCUMENTS

| | | | | |
|---|---|---|---|---|
| 7,301,914 B2 * | 11/2007 | Segal | ...................... | H04L 12/12 370/311 |
| 7,630,370 B2 * | 12/2009 | Deshpande | ......... | H04L 12/1854 370/255 |
| 7,890,090 B2 | 2/2011 | Hansen et al. | | |
| 8,289,883 B2 * | 10/2012 | Zhu | .......... | H04L 12/18 370/238 |
| 8,693,380 B2 * | 4/2014 | He | ......... | H04W 52/00 370/311 |
| 2004/0203946 A1 | 10/2004 | Wu et al. | | |
| 2004/0213177 A1 * | 10/2004 | Moritani | ............... | H04L 12/189 370/328 |
| 2005/0152392 A1 * | 7/2005 | Lim | .................... | H04L 12/1886 370/432 |
| 2006/0268823 A1 * | 11/2006 | Kim | .................... | H04W 72/005 370/349 |
| 2007/0060054 A1 | 3/2007 | Romesburg | | |
| 2009/0075642 A1 * | 3/2009 | Rantapuska | .......... | H04W 88/04 455/422.1 |

(Continued)

*Primary Examiner* — Candal Elpenord
(74) *Attorney, Agent, or Firm* — Jefferson IP Law, LLP

(57) ABSTRACT

A telephony collaboration system and method are provided. The method includes activating a wireless feature on an admin device, determining, whether a new group is to be created, determining whether to subscribe a guest device to an existing group, determining whether to join the guest device to a previously subscribed to group, when the admin device is to create the new group, creating the new group and assigning a name to the new group, when the guest device is to subscribe to the existing group, scanning for the existing group and transmitting a subscription request requesting that the guest device be subscribed to the existing group, and when the admin device is to join the previously subscribed to group, scanning for the previously subscribed to group and transmitting a join request requesting that the admin device be registered with the previously subscribed to group.

20 Claims, 5 Drawing Sheets

(56) References Cited

U.S. PATENT DOCUMENTS

| | | | |
|---|---|---|---|
| 2009/0279701 A1* | 11/2009 | Moisand | H04L 12/185 380/270 |
| 2010/0246394 A1* | 9/2010 | Omar | H04W 36/385 370/230.1 |
| 2013/0018960 A1* | 1/2013 | Knysz | H04L 65/403 709/204 |
| 2013/0210396 A1 | 8/2013 | Deshpande | |
| 2013/0235774 A1 | 9/2013 | Jo et al. | |
| 2014/0006502 A1* | 1/2014 | Gandhi | G06F 9/52 709/204 |
| 2014/0223019 A1 | 8/2014 | McCann et al. | |
| 2016/0094592 A1* | 3/2016 | Koch | G06F 17/30312 709/204 |

* cited by examiner

TELEPHONY COLLABORATION SYSTEM AND METHOD FOR A TRUSTED ENVIRONMENT

TECHNICAL FIELD

The present disclosure relates to a telephony collaboration system and method. More particularly, the present disclosure relates to a telephony collaboration system and method for a trusted environment.

BACKGROUND

Due to the popularity of cellphones in recent years, individuals often use their cellular telephone or cellphone as their primary communication device even when the individual or user is at home or at work. However, when the cellphone rings or vibrates due to an incoming call, it may be located anywhere, such as the user's home or work. Therefore, if the user is not close enough to the cellphone, the user may miss the incoming call because the user cannot hear the ring of the cellphone or cannot reach the cellphone in time. For example, when the user is at home and needs to make an urgent call, if the cellphone is not close by, then the user cannot quickly make the call. Similarly, if the user hears the call in a room in which the user is located, but the cellphone is located in another room, then the user is likely to miss the call because the user cannot reach or locate the cellphone in time and will miss the call. Also, if the cellphone is located in a briefcase or purse and the cellphone rings, then the user may not have enough time to retrieve the cellphone from the briefcase or purse and answer the call. As a result, the user will miss the call.

Accordingly, there is a need for a telephony collaboration system and method which allows collaboration of phones in a particular environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a telephony collaboration system and method which allows the collaboration of phones in a particular environment.

Another aspect of the present disclosure is to provide a method for forming and collaborating using a Telephony Collaboration Manager (TCM) subscription system including an admin device and a guest device. The method includes activating a wireless feature on the admin device, determining, by the admin device, whether a new TCM group is to be created by the admin device, determining, by the admin device, whether to subscribe the guest device to an existing group, determining, by the admin device, whether to join the guest device to a previously subscribed to TCM group, when the admin device determines that the admin device is to create the new TCM group, creating the new TCM group and assigning a name to the new TCM group, when the admin device determines that the guest device is to subscribe to the existing TCM group, scanning for the existing group and transmitting a subscription request requesting that the guest device be subscribed to the existing TCM group, and when the admin device determines that the guest device is to join the previously subscribed to TCM group, scanning for the previously subscribed to TCM group and transmitting a join request requesting that the guest device be registered with the previously subscribed to TCM group.

In accordance with an aspect of the present disclosure, a Telephony Collaboration Manager (TCM) subscription system is provided. The TCM subscription system includes an admin device configured to activate a wireless feature of the admin device to determine whether a new TCM group is to be created by the admin device, to determine whether to subscribe a guest device to an existing TCM group, and to determine whether to join the guest device to a previously subscribed to TCM group, a guest configured to join the new TCM group when the new TCM group is created, to join the existing TCM group when the guest device is to subscribe to the existing TCM group, and to join the previously subscribed to TCM group when the guest device is to join the previously subscribed to TCM group, and a relay device configured to connect one of the admin device and the guest device to another TCM group, wherein, when the admin device determines that the admin device is to create the new TCM group, the admin device is further configured to create the new TCM group and assigning a name to the new TCM group, wherein, when the admin device determines that the guest device is to subscribe to the existing TCM group, the guest device is further configured to scan for the existing TCM group and transmit a subscription request requesting that the guest device be subscribed to the existing TCM group, and wherein, when the admin device determines that the guest device is to join the previously subscribed to TCM group, the guest device is further configured to scan for the previously subscribed to TCM group and transmit a join request requesting that the guest device be registered with the previously subscribed to TCM group.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 5, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Hereinafter, in the present disclosure, a system and method for collaborative telephony will be described.

Figure 1:
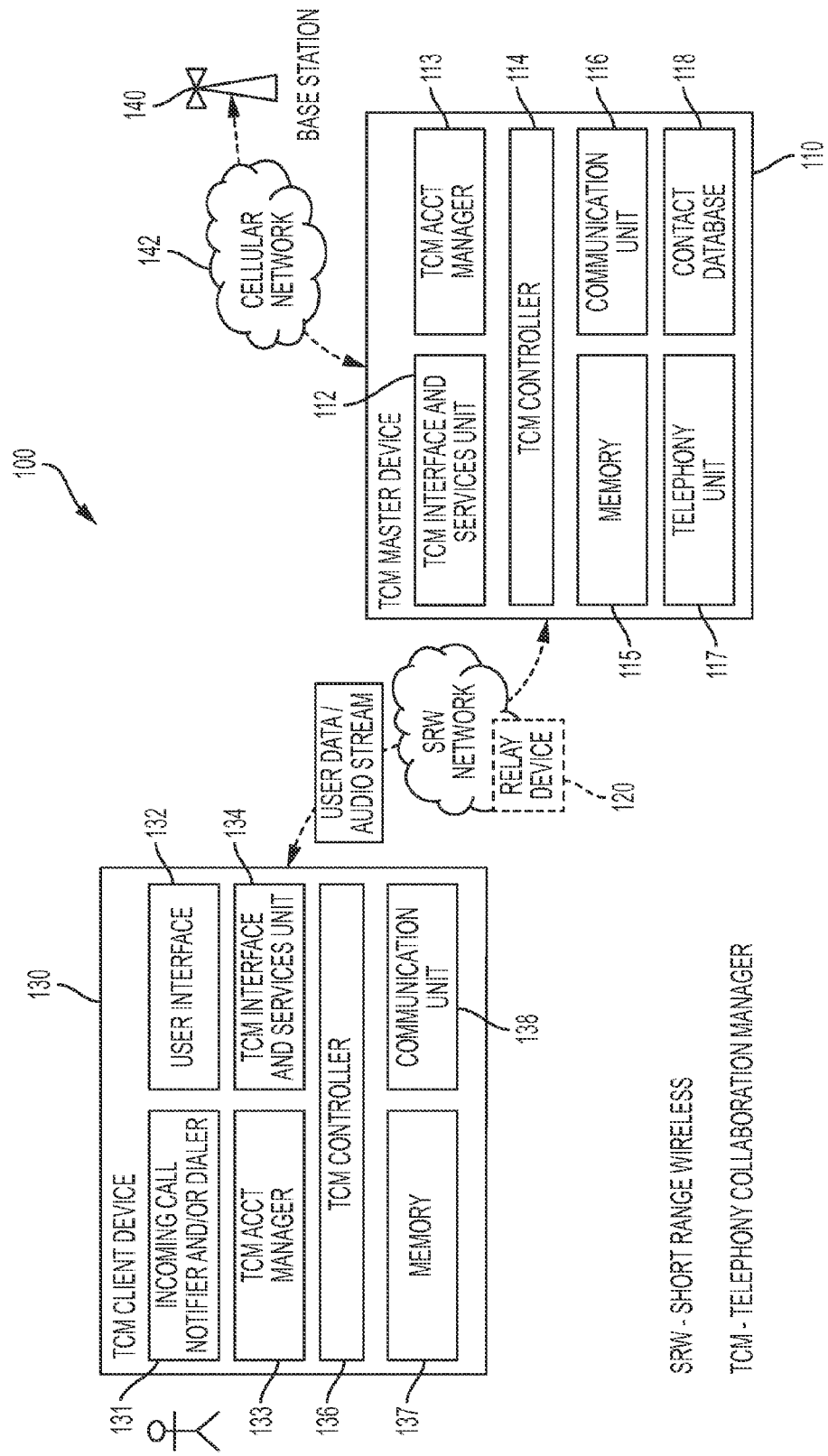
FIG. 1 is a block diagram of a telephone collaborative system according to an embodiment of the present disclosure.

FIG. 1 is a block diagram of a telephone collaborative system according to an embodiment of the present disclosure.

Referring to FIG. 1, a telephony collaborative system 100 is illustrated, where the telephony collaborative system 100 may include a Telephony Collaboration Manager (TCM) client device 130, a relay device 120 and a TCM master device 110 located in a secure or trusted environment. The trusted environment may include a new or an existing TCM group and the TCM group may include home users in a home environment or colleges in an office environment.

The TCM master device 110 may be at least one of a smart phone, a mobile phone, a video phone, a tablet or any other device used to communicate with another electronic device. In an embodiment of the present disclosure the TCM master device 110 is a cellphone of a user and is located somewhere in the home or office environment beyond the immediate reach of the user.

The TCM master device 110 may include a TCM interface and services unit 112, a TCM account manager 113, a TCM controller 114, a memory 115, a communication unit 116, a telephony unit 117 and a contact database 118.

The TCM interface and services unit 112 may include TCM software application programming interfaces and modules that provide interface and service functions to a user of the TCM master device 110. For example, the TCM interface and services unit 112 may include a TCM data manager, a Short Range Wireless (SRW) device scanner, a registry manager, a contact database, an encryption service, an authentication service, a wireless network service, an audio service, and a telephony service.

The TCM account manager 113 may include a software component that provides management of user accounts and provides the ability to track service subscriptions. For example, the software component may provide the user with the ability to add, delete and edit the user accounts.

The TCM controller 114 may include a software component that controls life cycles of all TCM services and functions. For example, the TCM controller 114 may terminate specific TCM services and functions after being enabled or unused for a certain period of time. Further, the TCM controller 114 may include a software component that coordinates system events of the TCM master device 110, controls notifications provided to the user by the TCM master device 110, manages and controls various resources of the TCM master device 110, and manages and controls any state machine executed by the TCM master device 110.

The memory 115 may include at least one module to store different types of data such as applications, media or any other type of data. For example, the memory 115 may store media information that can be utilized by the user of the TCM master device 110. For example, the memory 115 may be a Read Only Memory (ROM), Random Access Memory (RAM), and/or a flash memory.

The communication unit 116 may be used to communicate with at least one other electronic device, such as the TCM client device 130, the relay device 120 and an external device, such as a base station 140 using, for example, a cellular network 142. The communication unit 116 may support a short range protocol and may communicate using an SRW network (e.g., Wireless Fidelity (WiFi), Bluetooth (BT), Near Field Communication (NFC), etc.), network communications (e.g., Internet, a Local Area Network (LAN), a Wide Area Network (WAN), a telecommunication network, the cellular network 142, a satellite network, etc.), and/or a Plain Old Telephone Service (POTS).

The telephony unit 117 may provide basic phone call functionalities and software interfaces for monitoring basic phone information, such as network type, connection state, connection duration, etc. The telephony unit 117 may also provide various utilities for manipulating phone numbers and information associated therewith.

The contact database 118 is a database containing contact information, such as telephone numbers, email addresses, website addresses, street addresses, etc., which can be accessed and managed by the user of the TCM master device 110.

The relay device 120 may be a special client device that can act as a relay bridge for wireless data (e.g., wireless transmission of user data and/or an audio stream) if communication signals between the TCM master device 110 and the TCM client device 120 are weak. For example, when the communication signals between the TCM master device 110 and the TCM client device 130 are weak or begin to degrade, the relay device 120 improves communication between the TCM client device 130 and the TCM master device 110 by acting as an intermediary and boosting the communication signals.

The TCM client device 130 is a device that is picked up by a TCM user. As discussed above, the TCM client device 130 communicates with the TCM master device 110 via wireless communication.

The TCM client device 130 may include an incoming call notifier and/or dialer 131, a User Interface (UI) 132, a TCM account manager 133, a TCM interface and services unit 134, a TCM controller 136, a memory 137 and a communication unit 138.

The incoming call notifier and/or dialer 131 may provide the user with the functionality of placing a call, for example, once the TCM client device 110 has entered into a TCM mode. Further, the incoming call notifier and/or dialer 130 may provide the functionality of providing audio and/or visual notifications to the user of the TCM client device 130.

The UI 132 may provide the entire visual user interface to the user of the TCM client device 110. For example, the UI 132 may include a lock/unlock screen, and an interface that can be accessed during a call.

Similar to the TCM account manager 113 of the TCM master device 110, the TCM account manager 133 of the TCM client device 130 may include a software component that provides management of user accounts and provides the ability to track service subscriptions. For example, the software component may provide the user with the ability to add, delete and edit the user accounts.

Similar to the TCM interface and services unit 112 of the TCM master device 110, the TCM interface and services unit 134 of the TCM client device 130 may include TCM software application programming interfaces and modules that provide interface and service functions to a user of the TCM client device 130. For example, the TCM interface and services unit 134 may include a TCM data manager, an SRW device scanner, a registry manager, a contact database, an encryption service, an authentication service, a wireless network service, an audio service, and a telephony service.

Similar to the TCM controller 114 of the TCM master device 110, the TCM controller 136 of the TCM client device 130 may include a software component that controls life cycles of all TCM services and functions. For example, the TCM controller 114 may terminate specific TCM services and functions after being enabled or unused for a certain period of time. Further, the TCM controller 136 may include a software component that coordinates system events of the TCM client device 130, controls notifications provided by the TCM client device 130, manages and controls various resources of the TCM client device 130, and manages and controls any state machine executed by the TCM client device 130.

Similar to the memory 115 of the TCM master device 110, the memory 137 of the TCM client device 130 may include at least one module to store different types of data such as applications, media or any other type of data. For example, the memory 137 may store media information that can be utilized by the user of the TCM client device 130. For example, the memory 137 may be a ROM, a RAM and/or a flash memory.

Similar to the communication unit 116 of the TCM master device 110, the communication unit 138 of the TCM client device 130 may be used to communicate with at least one other electronic device, such as the TCM master device 110, the relay device 120 and an external device. The communication unit 138 may support a short range protocol and may communicate using an SRW network (e.g., WiFi, BT, NFC, etc.), network communications (e.g., Internet, a LAN, a WAN, a telecommunication network, the cellular network 142, a satellite network, etc.), and/or a POTS.

Figure 2:
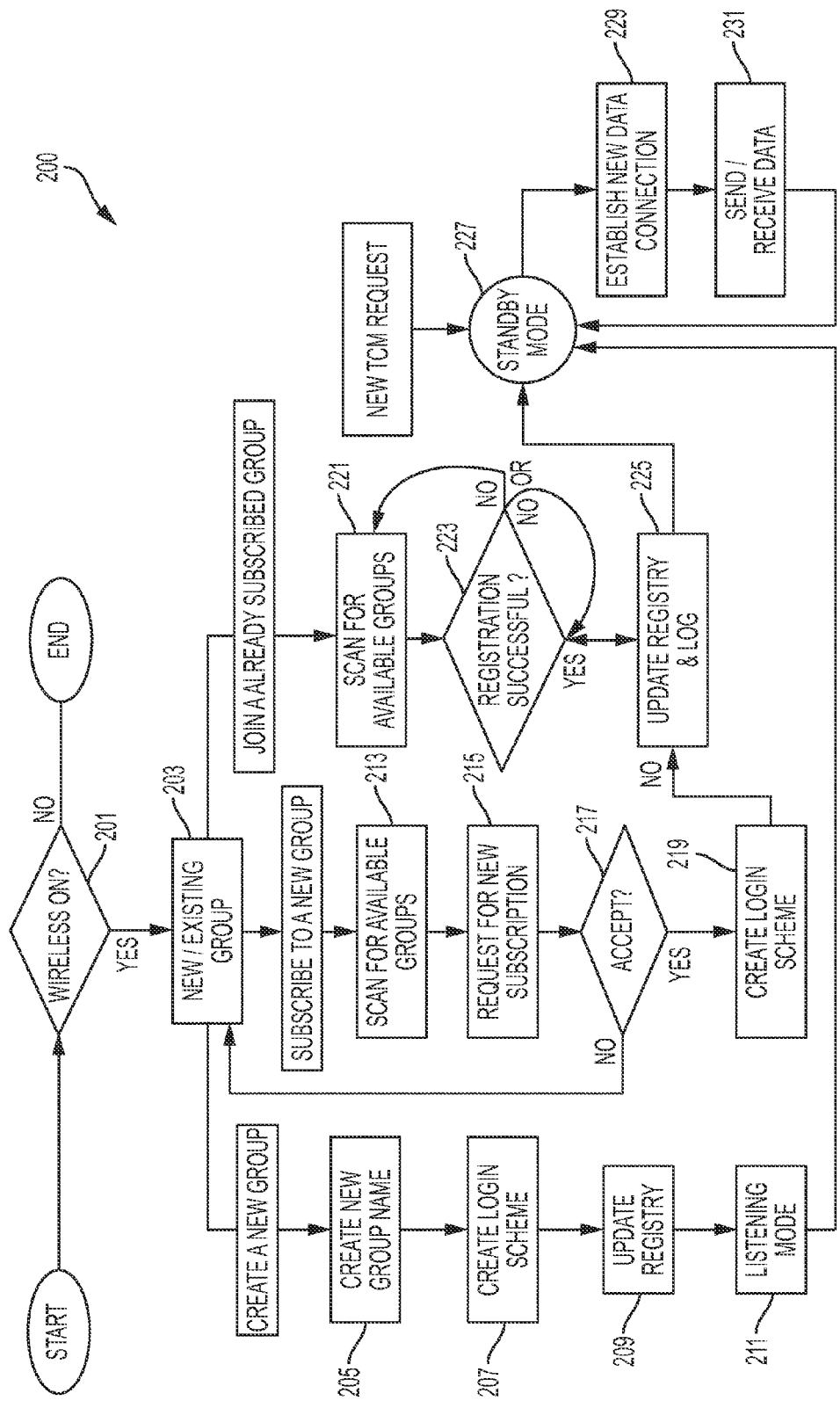
FIG. 2 is a flowchart illustrating a process of providing a Telephony Collaboration Manager (TCM) service according to an embodiment of the present disclosure.

FIG. 2 is a flowchart illustrating a process of providing a TCM service according to an embodiment of the present disclosure.

The TCM service may include a process performed by an admin device (e.g., a TCM host) and/or a guest device (e.g., a TCM guest). The admin device may be a device which creates a TCM group and which can be the only device authorized to remove the group. The guest device may be a device which subscribes to an existing group and which may be automatically assigned as the guest device.

Referring to FIG. 2, a flowchart 200 is illustrated, in which the flowchart 200 illustrates a process of providing a TCM service. In this process, upon starting the TCM service, in operation 201 an electronic device initially determines whether the wireless function of the electronic device is enabled. For example, the electronic device may be the admin device, such as the master device 110 as illustrated in FIG. 1 and may also be the guest device, such as the guest device 130 as illustrated in FIG. 1. If the wireless function of the admin device is not enabled, the operation of providing the TCM service is terminated.

If the wireless function of the admin device is enabled, the process continues to operation 203. At operation 203, the admin device determines whether to create a new group, to subscribe the guest device to a new/existing group or to join the guest device to an already subscribed to group.

If at operation 203 it is determined to create a new group, at operation 205, the admin device creates a new group and assigns the new group a name. Then, at operation 207 a login scheme is created in order to, for example, identify whether the user is authorized to access the TCM service. Thereafter, at operation 209, a registry of the admin device is updated, so as to be able to accurately track registrations of various TCM devices. Finally, at operation 211, the admin device enters a listening mode to listen for the guest device to join the newly created group.

The admin device also enters a standby mode at operation 227. When a new TCM request is received while the admin device is in the standby mode at operation 227, the admin device establishes a new data connection at operation 229 and the admin device sends/receives data at operation 231. After operation 231 the admin device returns to standby mode in operation 227.

Meanwhile, if at operation 203 it is determined that an electronic device, such as the guest device is to subscribe to a new/existing group, at operation 213 the guest device scans for available groups using, for example an SRW device scanner. Once a group has been found the guest device sends a request to an admin device of the found group for a new subscription to the found group at operation 215. Thereafter, at operation 217, the admin device determines whether to accept the request. If the request is not accepted, the process returns to operation 203, and if the request is accepted the process continues to operation 219. At operation 219, a login scheme is created between the admin device, the guest device and any other devices subscribed and/or joined to the group.

Alternatively, if at operation 203 it is determined that the guest device has already joined a subscribed group the guest device scans for available groups to which the guest device has subscribed at operation 221. Once a group is found at operation 221, the guest device attempts to become registered in the group and a determination as to whether the registration is successful is performed at operation 223.

If the registration is not successful, then the process returns to operation 221 or operation 223. Further, if the registration is successful, then the registry and a log of the admin device are updated at operation 225. It is noted that the updating of the registry and the log at operation 225 follows the registration of the guest device to an already subscribed to group as indicated at operation 223 or follows the creating of the login scheme when the guest device subscribes to the new/existing group as indicated at operation 219.

Thereafter, at operation 227 the electronic device (e.g., the admin device and/or the guest device) enters a standby mode. When a new TCM request is received while the electronic device is in the standby mode at operation 227, the electronic device establishes a new data connection at operation 229 and the electronic device sends/receives data at operation 231. After operation 231 the electronic device returns to standby mode in operation 227.

The TCM service includes subscribing to and/or unsubscribing from the service. The subscribing and/or unsubscribing to/from the service is required only once. The process allows enabling/disabling of TCM features including the creation and/or removal of device identification, TCM authentication, group IDs and the like.

The registration of the guest device to an already created group includes automatically searching and registering any nearby TCM devices. The process also includes maintaining the status of all online devices and unregistering a device that moves out of the range of the TCM group.

Finally, the TCM authentication includes a user creating a TCM authentication scheme during the subscription of the TCM service.

Figure 3:
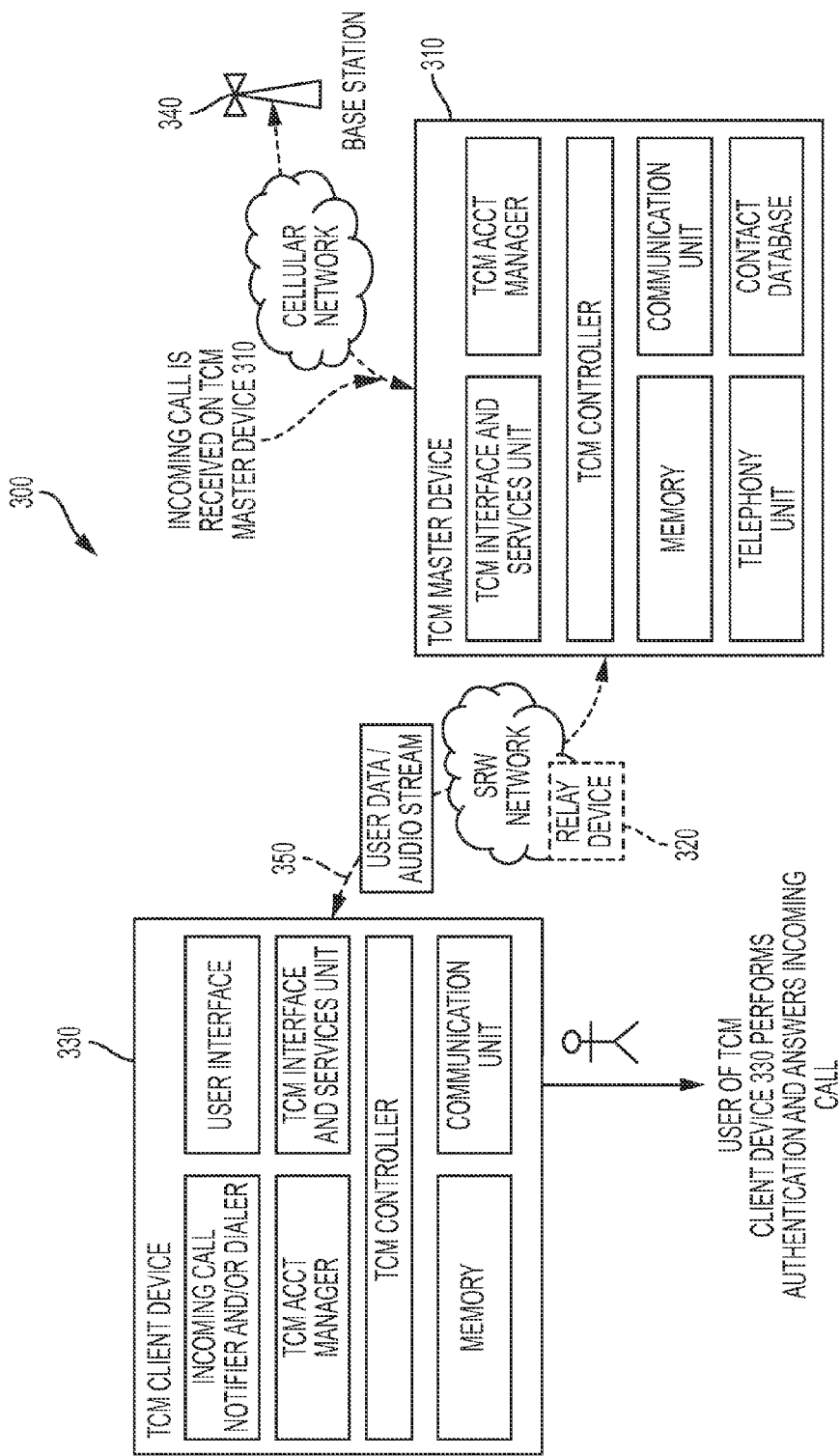
FIG. 3 is a block diagram illustrating a Mobile Originated (MO) collaborative system according to an embodiment of the present disclosure.

FIG. 3 is a block diagram illustrating an MO collaborative system according to an embodiment of the present disclosure.

Referring to FIG. 3, an MO collaborative system 300 is illustrated, where the MO collaborative system 300 includes a TCM master device 310, a relay device 320, a TCM client device 330 and a base station 340.

A detailed description of the elements of each of the devices, as illustrated in FIG. 3 and of the base station 340 has already been provided with respect to FIG. 1 and therefore a detailed description of these elements is not provided herein. For example, the TCM master device 310 corresponds to the TCM master device 110, as illustrated in FIG. 1, the TCM client device 330 corresponds to the TCM client device 130, as illustrated in FIG. 1, and the relay device 320 corresponds to the relay device 120, as illustrated in FIG. 1.

As illustrated in FIG. 3, when an incoming call is received at the TCM master device 310 of the MO collaborative system 300, the TCM master device 310 broadcasts control signals 350 to all nearby TCM devices, such as for example the TCM client device 330. Thereafter, all registered devices perform a notification action, such as playing a TCM ringtone, and/or displaying a visual notification. However, it is to be noted that the notification action is not limited thereto and many other forms of notifying the user of the master device 310 may be performed. A user of the TCM client device 330 is then able to answer the incoming call upon passing an authentication.

The authentication (e.g., a TCM authentication) is performed by the TCM master device 310 and/or the TCM client device 330 and may be the same as the authentication performed by the TCM master device 110 and/or the TCM client device 130. The user may pass the TCM authentication in order to unlock and answer the incoming call in any of the devices registered in the TCM subscription system. Further, it is noted that the call history may be updated only in the master device 310.

Figure 4:
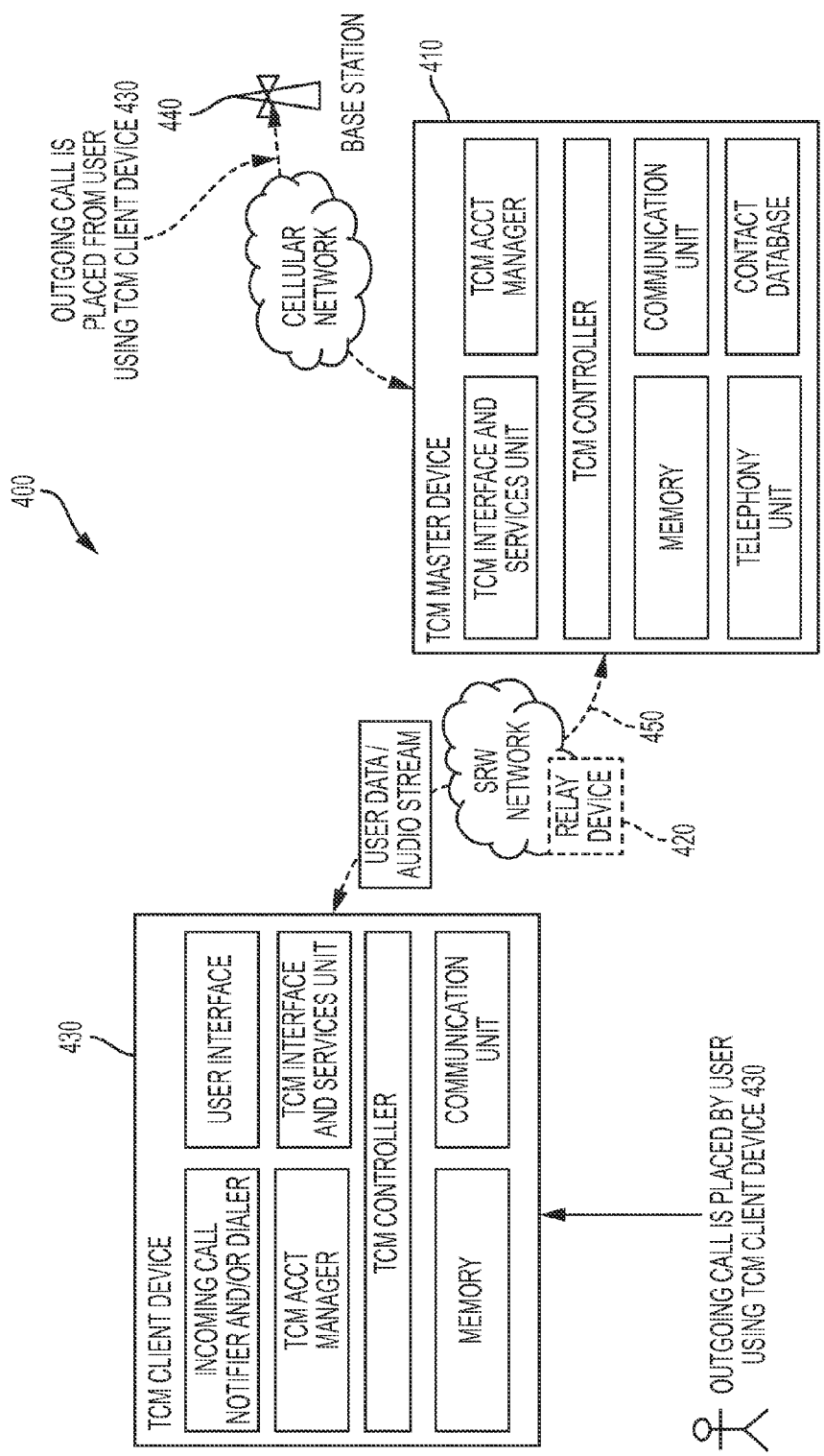
FIG. 4 is a block diagram illustrating a Mobile Terminated (MT) collaborative system according to an embodiment of the present disclosure.

FIG. 4 is a block diagram illustrating an MT collaborative system according to an embodiment of the present disclosure.

Referring to FIG. 4, an MT collaborative system 400 is illustrated, where the MT collaborative system 400 includes a TCM master device 410, a relay device 420, a TCM client device 430 and a base station 440.

A detailed description of the elements of each of the devices, as illustrated in FIG. 4 and of the base station 440 has already been provided with respect to FIG. 1 and therefore a detailed description of these elements is not provided herein. For example, the TCM master device 410 corresponds to the TCM master device 110, as illustrated in FIG. 1, the TCM client device 430 corresponds to the TCM client device 130, as illustrated in FIG. 1, and the relay device 420 corresponds to the relay device 120, as illustrated in FIG. 1.

As illustrated in FIG. 4, when the user wishes to place a call, the user may pick up any of the devices (e.g., the TCM client device 430) registered in the TCM subscription system and place the call using the connection between the base station 440 and the TCM master device 410. In order for the TCM client device 430 to place the call, signals 450 are transmitted to the TCM master device 410 from the TCM client device 430. Furthermore, in order for the TCM client device 430 to place the call, an unlock authentication is required and only TCM functions may be accessible in the TCM client device 430 upon passing the unlock authentication. It is also noted that although the call history is updated, the update may occur only in the TCM master device 410.

Figure 5:
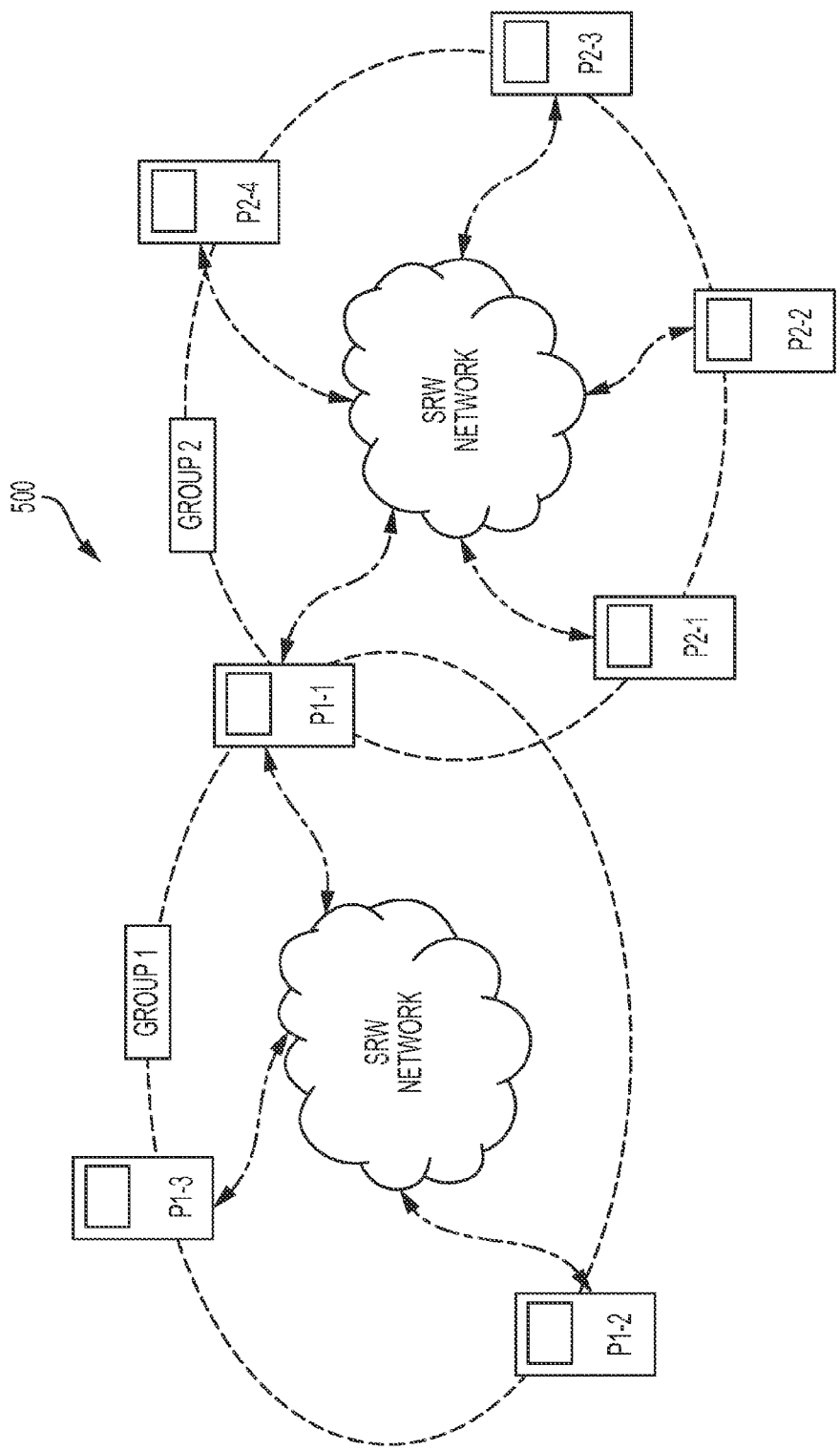
FIG. 5 is an illustration of a TCM subscription system including various groups according to an embodiment of the present disclosure.

FIG. 5 is an illustration of a TCM subscription system including various groups according to an embodiment of the present disclosure.

Referring to FIG. 5, a TCM subscription system 500 is illustrated, where the TCM subscription system 500 includes two groups, Group 1 and Group 2. Each group may include an admin device and several guest devices. For example, Group 1 includes three devices, p1-1, p1-2 and p1-3, one of which is the admin device and the remaining devices being guest devices. Similarly, Group 2 may also include various devices, p2-1, p2-2, p2-3 and p2-4, one of which is the admin device and the remaining devices being guest devices. Each of the device of Group 1 may communicate with each other using an SRW network (e.g., WiFi, BT, NFC, etc.) and each of the devices of Group 2 may communicate with each other using an SRW network (e.g., WiFi, BT, NFC, etc.).

It is noted that one device may belong to more than one group. For example, as illustrated in FIG. 5, device p1-1 may belong to Groups 1 and 2. Telephony functionality sharing is based on the TCM groups. As such, device p1-1 can subscribe to multiple groups and therefore, it may share the resources from either Group 1 or Group 2. Additionally, for example, device p1-1 can communicate to the devices of Group 1 and Group 2 using an SRW network (e.g., WiFi, BT, NFC, etc.).

The TCM subscription system according to an embodiment of the present disclosure promotes sharing existing resources of cellphones without adding new hardware costs to the system. In addition, the TCM subscription system connects cellphones together into one or multiple groups, which can be either cloud based or locally managed. Further, the TCM subscription system aims at collaborating not only just simple voice call functions but messaging and other cellphone functions. Finally, the technology behind telephony collaboration is much more dynamic and advanced.

In the TCM subscription system according to an embodiment of the present disclosure, an admin device is a TCM device that has created a TCM group and can add or remove other TCM devices from the TCM group. Each TCM group may only have one admin device. A guest device is another TCM device that has joined the TCM group. There may be many guest devices that have joined the TCM group. A new guest device sends a subscription requests to the admin device and becomes a member after approval.

In the TCM subscription system according to an embodiment of the present disclosure, after TCM groups are formed, TCM collaboration may be performed. When referring to TCM collaboration, a master device is a device that is, for example, owned by a user but is out of reach and is the device that handles incoming or outgoing cellular calls. Further, when referring to TCM collaboration, a client device is a device that is picked by the user to receive an incoming call or make an outgoing call using the SRW connection to the master device. An admin device may be a master device and client device and a guest device may also be a master device and a client device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for forming and collaborating using a Telephony Collaboration Manager (TCM) subscription system including an admin device and a guest device, the method comprising:
    activating a wireless feature on the admin device;
    determining, by the admin device, whether a new TCM group is to be created by the admin device;
    determining, by the admin device, whether to subscribe the guest device to an existing TCM group;
    determining, by the admin device, whether to join the guest device to a subscribed TCM group that the guest device previously joined;
    when the admin device determines that the admin device is to create the new TCM group, creating the new TCM group and assigning a name to the new TCM group;
    when the admin device determines that the guest device is to subscribe to the existing TCM group, scanning for the existing TCM group and transmitting a subscription request requesting that the guest device be subscribed to the existing TCM group; and
    when the admin device determines that the guest device is to join the subscribed TCM group that the guest device previously joined, scanning for the subscribed TCM group that the guest device previously joined and transmitting a join request requesting that the guest device be registered with the subscribed TCM group that the guest device previously joined.

2. The method of claim 1, wherein, after creating the new TCM group and assigning the name to the new TCM group, the method further comprises:
    generating a login scheme;
    updating a registry of the admin device; and
    entering the admin device into a standby mode to listen for a connection from another TCM device.

3. The method of claim 1, wherein, when the subscription of the guest device to the existing TCM group is accepted as a result of the transmitted subscription request, the method further comprises:
    creating a login scheme;
    updating a registry and a log of the admin device;
    transmitting data regarding the existing TCM group to all devices joined to the existing TCM group; and
    entering the admin device into a standby mode to listen for a connection from another TCM device.

4. The method of claim 1, wherein, when the registration of the guest device to the existing TCM group is accepted as a result of the transmitted join request, the method further comprises:
    updating a registry and a log of the admin device;
    transmitting data regarding the existing TCM group to all devices joined to the existing TCM group; and
    entering the admin device into a standby mode to listen for a connection from another TCM device.

5. The method of claim 1, wherein, when the guest device is subscribed to the existing TCM group or is joined to the subscribed TCM group that the guest device previously joined, the method further comprises:
    when a TCM request is received from a client device, being one of the admin device and the guest device, while a master device, being another of the admin device and the guest device, is in a standby mode, establishing a data connection between the client device and the master device and sending and/or receiving data to/from the client device.

6. The method of claim 5,
    wherein the master device is connected to a base station through a cellular network, and
    wherein the client device communicates to the base station through the master device by using the established data connection.

7. The method of claim 1, wherein the subscribing of the guest device to the existing TCM group is performed only once and the subscription enables and/or disables TCM features of the guest device, the TCM features comprising at least one of creating and/or removing device identification, authentication and group identification.

8. The method of claim 1, wherein the requesting that the guest device be registered with the subscribed TCM group that the guest device previously joined comprises at least one of automatically searching and registering any nearby TCM devices, maintaining a status of all online devices, and unregistering any TCM device that moves out of a range of the TCM subscription system.

9. The method of claim 1, further comprising:
    enabling and performing, by the admin device, TCM services and functions; and
    terminating, by the admin device, the TCM services and functions after being enabled or unused for a certain period of time.

10. The method of claim 1, further comprising performing, by the admin device, one of adding, deleting and editing user account information stored on the admin device.

11. A Telephony Collaboration Manager (TCM) subscription system comprising:
    an admin device configured to:
        activate a wireless feature of the admin device;
        determine whether a new TCM group is to be created by the admin device;
        determine whether to subscribe a guest device to an existing TCM group; and determine whether to join the guest device to a subscribed TCM group that the guest device previously joined;

a guest device configured to:
  join the new TCM group when the new TCM group is created;
  join the existing TCM group when the guest device is to subscribe to the existing TCM group; and
  join the subscribed TCM group that the guest device previously joined when the guest device is to join the subscribed TCM group that the guest device previously joined; and a relay device configured to connect one of the admin device and the guest device to another TCM group, wherein, when the admin device determines that the admin device is to create the new TCM group, the admin device is further configured to create the new TCM group and assigning a name to the new TCM group, wherein, when the admin device determines that the guest device is to subscribe to the existing TCM group, the guest device is further configured to scan for the existing TCM group and transmit a subscription request requesting that the guest device be subscribed to the existing TCM group, and wherein, when the admin device determines that the guest device is to join the subscribed TCM group that the guest device previously joined, the guest device is further configured to scan for the subscribed TCM group that the guest device previously joined and transmit a join request requesting that the guest device be registered with the subscribed TCM group that the guest device previously joined.

12. The TCM subscription system of claim 11, wherein, after creating the new TCM group and assigning the name to the new TCM group, the admin device is further configured to:
  generate a login scheme;
  update a registry of the admin device; and
  enter the admin device into a standby mode to listen for a connection from another TCM device.

13. The TCM subscription system of claim 11, wherein, when the subscription of the guest device to the existing TCM group is accepted as a result of the transmitted subscription request, the admin device is further configured to:
  create a login scheme;
  update a registry and a log of the admin device;
  transmit data regarding the existing TCM group to all devices joined to the existing TCM group; and
  enter into a standby mode to listen for a connection from another TCM device.

14. The TCM subscription system of claim 11, wherein, when the registration of the guest device to the existing group is accepted as a result of the transmitted join request, the admin device is further configured to:
  update a registry and a log of the admin device;
  transmit data regarding the existing TCM group to all devices joined to the existing TCM group; and
  enter the admin device into a standby mode to listen for a connection from another TCM device.

15. The TCM subscription system of claim 11, wherein, when the guest device is subscribed to the existing TCM group or is joined to the subscribed TCM group that the guest device previously joined, and when a TCM request is received from a client device, being one of the admin device and the guest device, while a master device, being another of the admin device and the guest device, is in a standby mode, the master device is further configured to:
  establish a data connection with the client device; and
  send and/or receive data to/from the client device.

16. The TCM subscription system of claim 15,
  wherein the master device is connected to a base station through a cellular network, and
  wherein the client device is further configured to communicate to the base station through the master device by using the established data connection.

17. The TCM subscription system of claim 11, wherein the subscribing of the guest device to the existing TCM group is performed only once and the subscription enables and/or disables TCM features of the guest device, the TCM features comprising at least one of creating and/or removing device identification, authentication and group identification.

18. The TCM subscription system of claim 11, wherein the requesting that the guest device be registered with the subscribed TCM group that the guest device previously joined comprises at least one of automatically searching and registering any nearby TCM devices, maintaining a status of all online devices, and unregistering any TCM device that moves out of a range of the TCM subscription system.

19. The TCM subscription system of claim 11, wherein the admin device is further configured to:
  enable and perform TCM services and functions; and
  terminate the TCM services and functions after being enabled or unused for a certain period of time.

20. The TCM subscription system of claim 11, wherein the admin device is further configured to perform one of adding, deleting and editing user account information stored on the admin device.

* * * * *